Jan. 24, 1939.  J. P. MILLER  2,144,727
SIGNALING SYSTEM FOR VEHICLES
Filed May 10, 1937
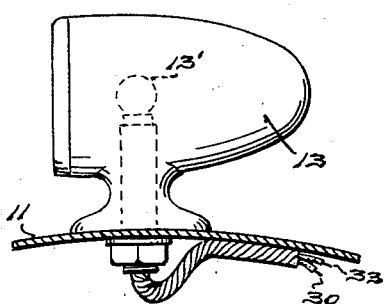
Fig. 1.
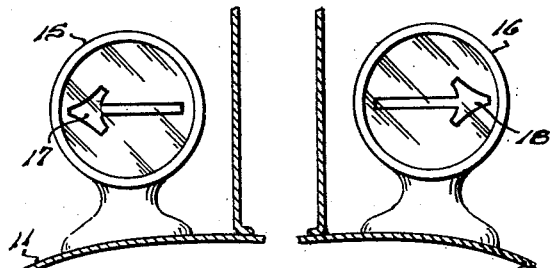
Fig. 2.
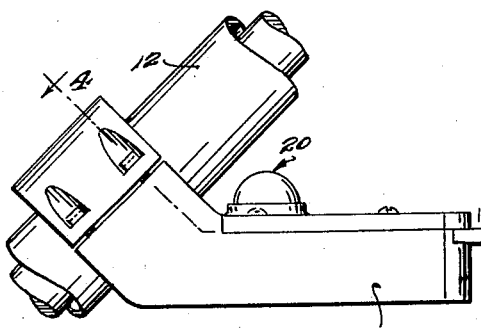
Fig. 3.
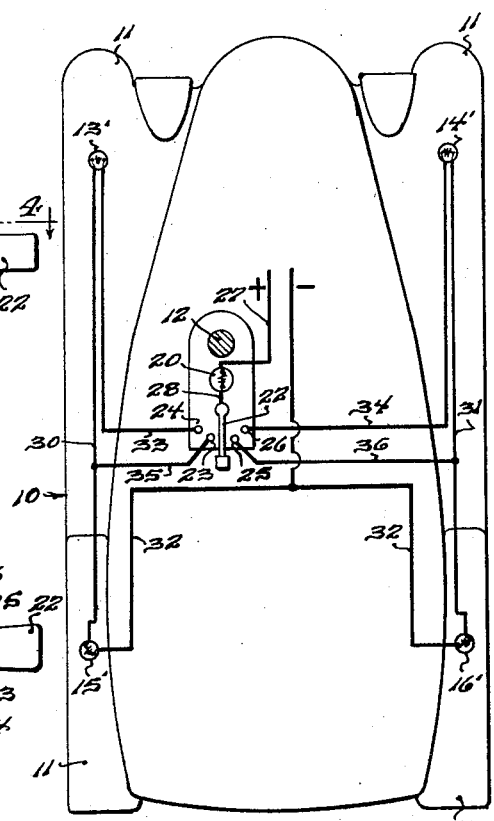
Fig. 4.
Fig. 5.
INVENTOR.
John P. Miller
BY
ATTORNEYS.

Patented Jan. 24, 1939

2,144,727

UNITED STATES PATENT OFFICE 2,144,727

SIGNALING SYSTEM FOR VEHICLES

John P. Miller, Seattle, Wash.

Application May 10, 1937, Serial No. 141,740

4 Claims. (Cl. 177—311)

This invention relates to a signal system for automotive vehicles and its object is the perfecting of a system of electrically energized signal devices for changeably exposing to view directional signals in a most advantageous manner.

The signals heretofore used to indicate a change in the directional travel of an automotive vehicle have most generally exposed the signal to the view of drivers to the rear of the vehicle only and while some attempts have been made to pluralize the directional signals in a manner to expose the same to the view of drivers approaching from the front as well as to the rear, the arrangements have not heretofore obtained a favorable reaction from the driving public, the principal objection thereto being the difficulty encountered in checking the multiple lamps. I provide, through the utilization of a pilot light and advanced circuits associated therewith, a system whereby the driver is warned as to the existence of a dead lamp and thereafter may instantly locate the defective bulb.

The means by which the foregoing end is attained and other objects and advantages of the invention will appear in the course of the following detailed description and claims. The invention consists in the novel construction, adaptation, and combination of parts hereinafter described and claimed.

In the drawing:—

Figure 1 is a detail side elevational view of one of the plural direction signals as applied to the fender of an automotive vehicle.

Fig. 2 is a similar view in rear elevation illustrating the left and right turn signals as applied to the left rear and the right rear fender, respectively.

Fig. 3 is a detail side elevational view of the switch box for the signals, indicated as being mounted on the steering column of the vehicle.

Fig. 4 is a horizontal section taken on the jogged section line 4—4 of Fig. 3; and Fig. 5 indicates the vehicle in outline and diagrammatically therewith the electric circuits used in the system.

The reference numeral 10 designates the body of an automotive vehicle. The parts thereof to which reference is had in the following description are the fenders and the steering column, represented respectively by 11 and 12.

According to my invention I utilize direction indicators which preferably consist of signal casings 13, 14, 15, and 16 carried on the four fenders, these casings providing sockets for the reception of electrically energized signal lamps 13', 14', 15', and 16' which act to illuminate translucent lenses. Appearing on the lenses are "left-turn" and "right-turn" direction arrows 17 and 18, the former on the left front and left rear signals and the latter on the right front and right rear signals.

Employed with said signal lamps is a pilot light 20 located within the driver's compartment of the vehicle, either on the switch box 21 indicated as being attached to the steering column 12 or as may be otherwise desired. The switch with which said box is equipped is represented at 22 and is or may be of the brush character radially movable into contact with terminals which close normally-open electric circuits including the signal lamps and the pilot light. These terminals I indicate as four in number, two lying at each side of the normally inactive medial position of the switch, those to the left, denoted by 23 and 24, acting to excite the "left-turn" signal lamps and those to the right, denoted by 25 and 26, exciting the "right-turn" signal lamps. All of the circuits closed by the switch include the pilot light 20 which connects by a lead 27 with one terminal of the vehicle storage battery and by a lead 28 with the switch. The two lamps 13' and 15', the "left-turn" signal lamps, are connected by a lead 30 and the two "right-turn" signal lamps 14' and 16' connect by a lead 31. Leads 32 extend from both of the rear lamps to the opposite terminal of the storage battery. Acting to excite both lamps 13' and 15' or both lamps 14' and 16', leads 33 and 34 connect the outer switch terminals 24 and 26 with the lamps 13' and 14', respectively. Operating to isolate the front lamps, leads 35 and 36 respectively extend from the initially-contacted switch terminals 23 and 25 to the rear lamps only.

The system should be clear, the operator in advance of a left turn or a right turn, as the case may be, throwing the switch to the left or to the right, the rear signal lamp being momentarily excited as the switch brushes the first contact and being subsequently illuminated together with the front signal lamp as the switch contacts the outer terminal 24 or 26. The double flash of the pilot light indicates an energizing of both signal lamps concerned, the series circuits used being broken as any one light in the circuit burns out.

A lamp which has burnt out is, by recourse to the pilot light, immediately located upon manipulation of the switch. A defective pilot light is indicated as having broken the circuit if the same fails to light either on a "left-turn" or a "right-turn" signal and the operator may readily detect whether a front or rear lamp has caused a circuit break by brushing the initially-contacted terminal 23 or 25, according as to whether the "left-turn" or the "right-turn" signal is inoperative, in that the front lamp is isolated.

The particular arrangement which I employ aside from providing approximately instantaneous location of a defective bulb when the pilot bulb fails to light, is advantageous from the fact that the initial flash of the rear lamp most effectively attracts the attention of a following driver to the signal being given.

Excepting as the same are necessarily used in the hereto annexed claims, no limitations are to be implied from the disclosure of my preferred embodiment and I intend that the claims be given a breadth in their interpretation commensurate with the scope of the invention within the art.

What I claim, is:—

1. In signaling devices for automotive vehicles, the combination of electrically energized signal lamps located at the left front and left rear of the vehicle for indicating left turns and at the right front and right rear of the vehicle for indicating right turns, a pilot light, a normally open electric circuit including the pilot light and the left turn signal lamps in series, a normally open electric circuit including the pilot light and the right turn signal lamps in series, normally open electric circuits independent of one another including the pilot light in series with the rear lamp only of each of said left turn and right turn signal circuits, and a normally inactive switch for closing the circuits selectively.

2. The signaling system as defined in claim 1 wherein the circuit-closing terminals associated with the switch momentarily close a related one of said last-named independent circuits coincident with the movement of the switch into circuit closing relation to the first-named circuits.

3. The combination, in signaling devices for automotive vehicles, of electrically energized signal lamps located at the front and the rear of the vehicle, a pilot light, a normally open electric circuit including the pilot light and said front and rear signal lamps in series, a normally open electric circuit including the pilot light and the rear signal lamp only in series, and a switch for closing said circuits selectively.

4. In signaling devices for automotive vehicles, the combination of electrically energized directional signals located at the front and the rear of the vehicle, an electrically energized pilot signal, a normally open series electric circuit including the pilot signal and the forwardly and rearwardly disposed directional signals, a normally open series electric circuit including the pilot signal and the rearwardly disposed directional signal only, and a circuit-closing switch for said circuits acting to momentarily close the last-named circuit coincident with the movement of the switch into circuit-closing relation to the first-named circuit.

JOHN P. MILLER.